United States Patent
Clark et al.

(10) Patent No.: US 11,256,159 B2
(45) Date of Patent: Feb. 22, 2022

(54) CAMERA SHUTTERS

(71) Applicant: Hewlett-Packard Development Company, L.P., Spring, TX (US)

(72) Inventors: Alexander Wayne Clark, Spring, TX (US); Derek Kanas, Spring, TX (US); King Sui Kei, Spring, TX (US); Peter Siyuan Zhang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/046,000

(22) PCT Filed: Sep. 28, 2018

(86) PCT No.: PCT/US2018/053309
§ 371 (c)(1),
(2) Date: Oct. 8, 2020

(87) PCT Pub. No.: WO2020/068099
PCT Pub. Date: Apr. 2, 2020

(65) Prior Publication Data
US 2021/0208479 A1 Jul. 8, 2021

(51) Int. Cl.
*G03B 11/04* (2021.01)
*H04N 5/232* (2006.01)
(Continued)

(52) U.S. Cl.
CPC ........... *G03B 11/043* (2013.01); *G03B 30/00* (2021.01); *G06F 1/1686* (2013.01);
(Continued)

(58) Field of Classification Search
CPC ...... G03B 11/043; G03B 30/00; G03B 29/00; H04N 5/23218; H04N 5/23229;
(Continued)

(56) References Cited

U.S. PATENT DOCUMENTS 8,896,754 B2   11/2014   Mundt et al.
2014/0016031 A1   1/2014   Tsai et al.
(Continued)

FOREIGN PATENT DOCUMENTS

DE   202015004486   6/2016
KR   20060109032   10/2006
WO   WO-2018002681   1/2018

OTHER PUBLICATIONS

Camera Manual Privacy Shutter, NuBryte Support Center, Jul. 27, 2018.

*Primary Examiner* — Nelson D. Hernández Hernández
(74) *Attorney, Agent, or Firm* — HPI Patent Department

(57) ABSTRACT

Examples disclosed herein provide a computing device. As an example, the computing device includes a camera comprising a lens, and a housing comprising an opening extending through the housing, wherein the opening is to accommodate the lens. The housing further includes a shutter to selectively obscure the opening, and a mechanical trigger, upon receiving an electrical signal, to move the shutter to obscure the opening. Upon the mechanical trigger engaging the shutter to obscure the opening, the housing further includes a mechanical feature to block the mechanical trigger from moving the shutter to expose the opening

8 Claims, 5 Drawing Sheets

(51) Int. Cl.
*G03B 30/00* (2021.01)
*G06F 1/16* (2006.01)
*G06K 9/00* (2006.01)
*G10L 25/51* (2013.01)
*H04R 1/08* (2006.01)

(52) U.S. Cl.
CPC .......... *G06K 9/00711* (2013.01); *G10L 25/51* (2013.01); *H04N 5/23218* (2018.08); *H04N 5/23229* (2013.01); *H04R 1/08* (2013.01)

(58) Field of Classification Search
CPC ... G06F 1/1686; G06K 9/00711; G10L 25/51; H04R 1/08
See application file for complete search history.

(56) References Cited

U.S. PATENT DOCUMENTS

| | | | |
|---|---|---|---|
| 2016/0105598 A1* | 4/2016 | Zeira .................. | H04N 5/2252 348/143 |
| 2018/0059510 A1* | 3/2018 | Gustaveson, II .... | H04N 5/2257 |

* cited by examiner

CAMERA SHUTTERS

BACKGROUND

Computing devices, such as laptop computers, desktop computers, and smartphones, may include a camera (e.g., webcam). The camera may capture electronic images such as photos and/or video images. The camera may capture the electronic images responsive to an input such as an input provided by a user and/or an application, among other possibilities. The cameras may be located on an external surface of the computing device, in order to promote capture of the electronic images.

DETAILED DESCRIPTION

Privacy is a concern for users of such computing devices including cameras. For instance, control may be gained of a camera in a computing device for a variety of undesired reasons. For instance, control may be acquired of the camera included in the computing device and/or access may be gained to electronic images captured by the camera, unbeknownst to a user of the computing device. In some approaches, this may be possible because the camera may be visible and accessible to the user at all times during operation of the computing device. For example, in some approaches the camera may be mounted on an exterior portion of the computing device (e.g., on a display of the computing device), where it may be visible and accessible to the user during operation of the computing device.

Examples disclosed herein provide the ability to automatically trigger a privacy solution, for example, to cover the lens of a camera in a computing device. As will be further described, a one-way privacy shutter may be electronically controlled to obscure the lens of the camera, or the opening extending through a housing of the computing device that accommodates the lens. However, once the privacy solution is digitally activated, a physical action may be required by a user of the computing device, in order to expose the lens of the camera once again for use. As a result, the one-way privacy solution may prevent any software, firmware, or electrical hack from exposing the lens of the camera once the privacy solution has been triggered. Rather, manual intervention may be required, as will be further described.

In addition, the digital activation of the privacy solution may be triggered by machine learning that automates the process in making the determination and, as a result, protects users proactively. As users, at times, can forget to close the shutter themselves, the computing device may automatically trigger the privacy solution when needed. As will be further described, the computing device, by analyzing video stream captured by the camera via the lens, and relying on various sensors, may make predictions when the privacy solution needs to be triggered.

Figure 1A:
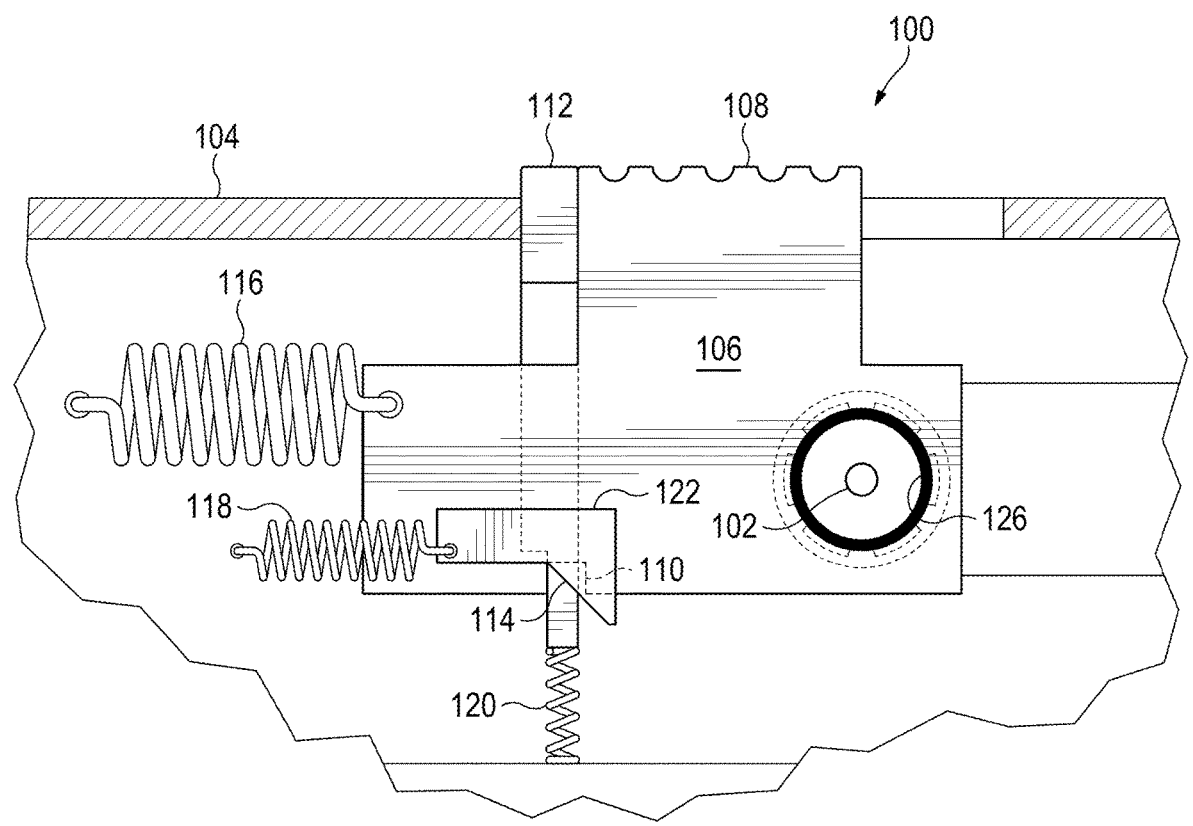
FIGS. 1A-D illustrate a computing device including a housing with a shutter, to provide privacy measures to users of the computing device, according to an example.
Figure 1B:
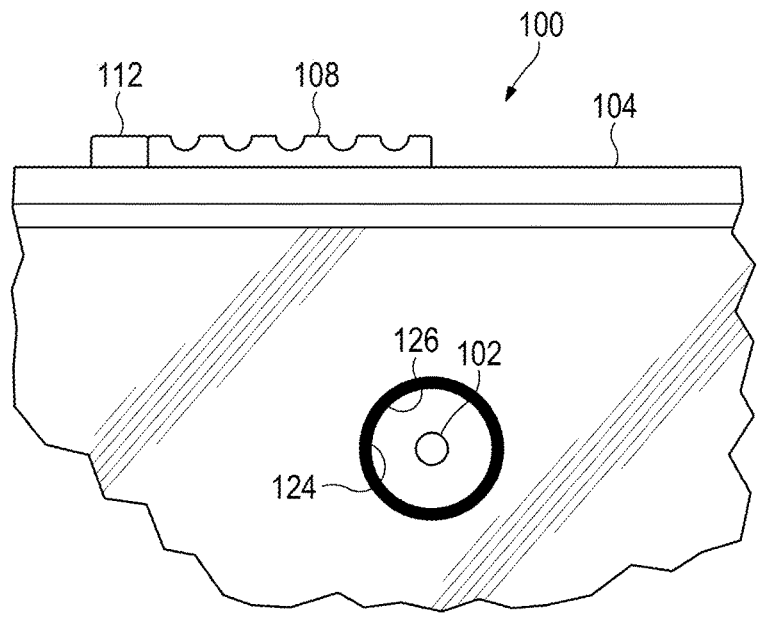

With reference to the figures, FIGS. 1A-D illustrate a computing device 100 including a housing 104 with a shutter 106 to provide privacy measures to users of the computing device 100, according to an example. As an example of the privacy measures provided by the shutter 106, the shutter 106 may selectively obscure a lens 102 of a camera of the computing device 100, as will be further described. Referring to FIG. 1B, an opening 124 extending through a bezel of the housing 104 may accommodate the lens 102, and the shutter 106 may be disposed within the housing 104, in between the opening 124 and lens 102. As will be further described, the shutter 106 may switch between obscuring the opening 124, thereby covering lens 102, and exposing the opening 124, thereby making the lens 102 of the camera available for use.

Figure 1C:
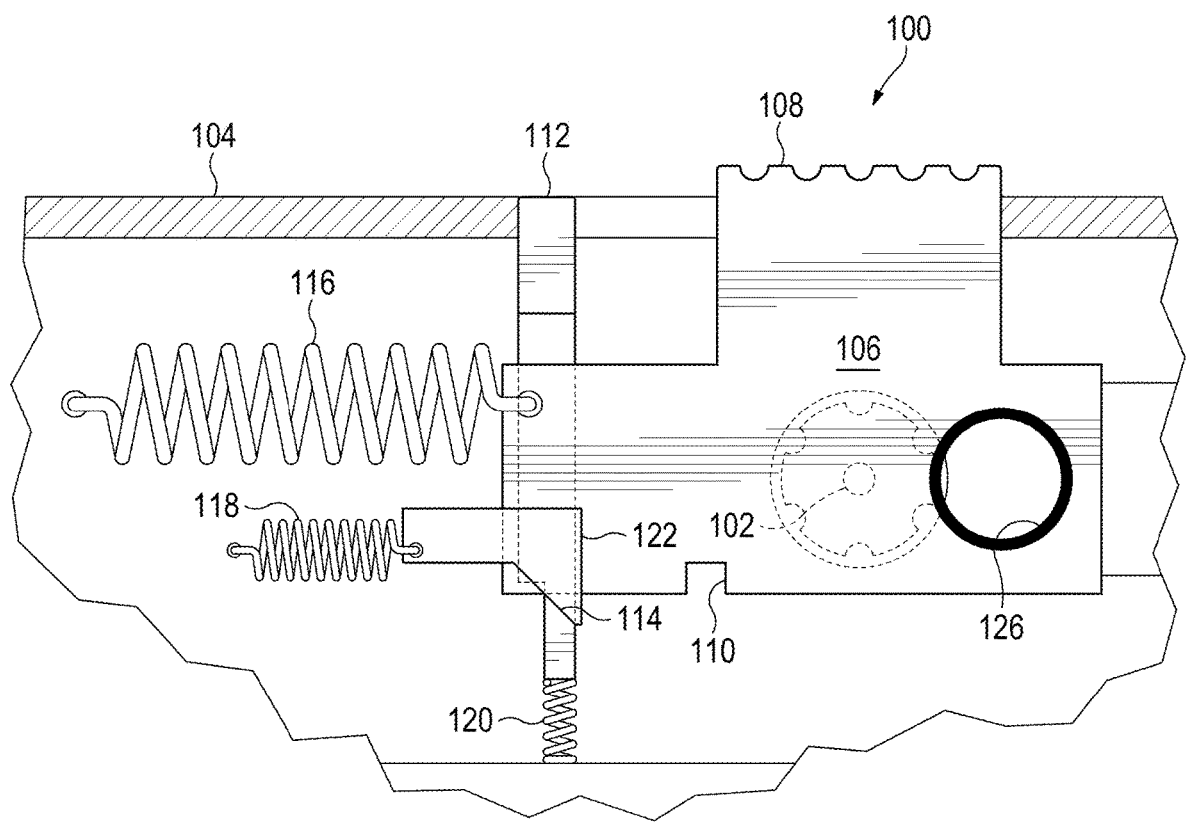
Figure 1D:
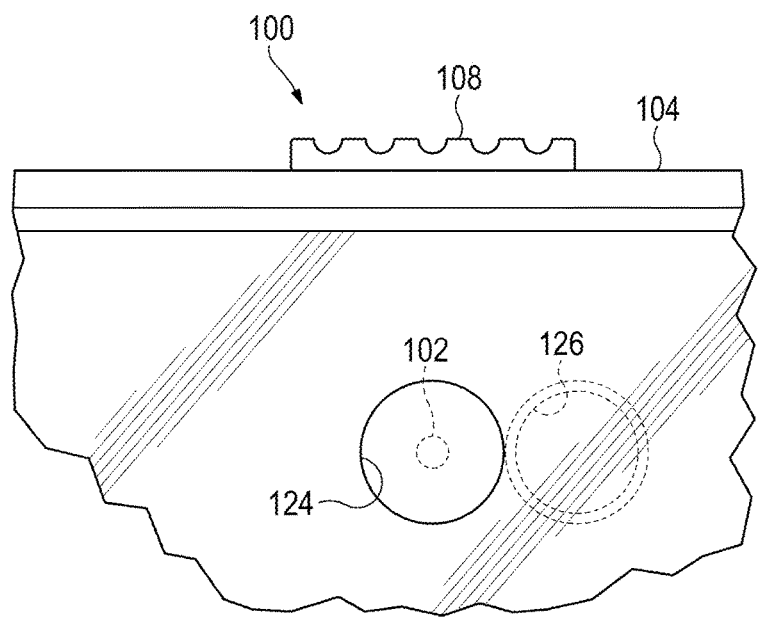

As an example, movement of the shutter 106, at least in the direction to obscure opening 124 (e.g., see FIG. 1C), may be triggered electronically or via a digital activation, as will be further described. Referring to FIG. 1D, as an opening 126 in the shutter 106 no longer aligns with the opening 124 extending through the bezel of the housing 104, the lens 102 of the camera is blocked, by the shutter 106, from capturing images. Upon activating the shutter 106 to obscure opening 124, a physical action may then be required by a user of the computing device 100, such as moving the shutter 106 back in an opposite direction, in order to line up opening 126 in the shutter 106 with the opening 124, thereby making the lens 102 of the camera available for use again. As an example, a knob 108 coupled to the shutter 106 may be used by the user to move the shutter 106 back to the position illustrated in FIG. 1A. As manual intervention is required to make the lens 102 of the camera available for use after the shutter 106 has been electrically triggered for privacy measures, actions from malicious agents, such as hackers, may be thwarted.

Referring to FIG. 1A, opening 126 in the shutter 106 lines up with opening 124, thereby making the lens 102 of the camera available for use. As an example, spring 116, coupled to the shutter 106, is in a contracted state, and spring 120, coupled to a locking pin 112, is in equilibrium or a slightly contracted state. Although spring 116 is under tension, the shutter 106 is held in place, due to the placement of the locking pin 112, particularly at 114, within a notch 110 of the shutter 106. As spring 120, coupled to the locking pin 112, is in equilibrium, the shutter 106 will be held in place until either a manual or digital activation occurs. As an example, the shutter 106 can be activated manually by a user to obscure the opening 124, by the user pressing down on the locking pin 112 near the knob 108, thereby releasing the locking pin 112 at 114 from the notch 110 of the shutter 106. As a result, spring 116 transitions from a contracted state to an equilibrium state (or slightly contracted) while moving the shutter 106 to obscure the opening 124, as illustrated in FIG. 1C. Spring 120 then remains in a contracted state, while the locking pin 112 at 114 is removed from the notch 110, as illustrated.

With regards to digital activation, the computing device 100 comprises a mechanical trigger, upon receiving an electrical signal, to move the shutter 106 to obscure the opening 124. Referring back to FIG. 1A, the mechanical trigger may correspond to a number of the illustrated components of computing device 100, particularly a combination of springs 116, 120, memory alloy 118, trigger release 122, and locking pin 112. As an example, memory alloy 118, coupled to the trigger release 122, may correspond to a one-way type shape memory alloy. Starting at FIG. 1A, memory alloy 118 is in an extended state. However, upon receiving an electric current, for example, due to the digital activation, the memory alloy 118 may contract, pulling the trigger release 122. As the trigger release 122 makes contact with the locking pin 112, as illustrated, movement of the trigger release 122 then pushes the locking pin 112 down and out of the notch 110 of the shutter 106. Finally, spring 116 transitions from the contracted state to the equilibrium state (or slightly contracted) while moving the shutter 106 to obscure the opening 124, as illustrated in FIG. 1C. As an example, memory alloy 118 naturally cools off and keeps its original form until stretched again, as will be further described.

As described above, upon activating the shutter 106 to obscure opening 124, whether by manual or digital activation, a physical action may then be required by a user of the computing device 100, such as moving the shutter 106 back in an opposite direction, in order to line up opening 126 in the shutter 106 with the opening 124, thereby making the lens 102 of the camera available for use again. As a result, although digital activation may be used to mechanically trigger movement of the shutter 106 to obscure opening 124, a mechanical feature may block a trigger, electronically or via digital activation, from moving the shutter 106 to expose the opening 124 again. For example, by relying on the arrangement of the springs, particularly spring 116, and the displacement of the locking pin 112 from notch 110, manual intervention may be required to move shutter 106, in order to make lens 102 of the camera available for use again. As an example, a knob 108 coupled to the shutter 106 may be used by the user to move the shutter 106 back to the position illustrated in FIG. 1A. Once the shutter 106 is moved back via the knob 108, as spring 120 was originally in a contracted state, as illustrated in FIG. 1C, spring 120 moves the locking pin 112 back into the notch 110 at 114. As locking pin 112 moves back into the notch 110, the trigger release 122 is pushed to the right, transitioning the memory alloy 118 into an extended state. The shutter 106 may then be digitally (or manually) activated once again to provide privacy measures, when necessary.

FIGS. 2A-D illustrate a computing device 200 including a housing 204 with a shutter 206 to provide privacy measures to users of the computing device 200, according to an example. Computing device 200 may be similar to other example computing devices described above. Further, the similarly-named elements of computing device 200 may be similar in function and/or structure to the respective elements of other example computing devices, as they are described above. Similar to shutter 106, shutter 206 may selectively obscure a lens 202 of a camera of the computing device 200. For example, an opening 224 extending through a bezel of the housing 204 may accommodate the lens 202, and the shutter 206 may be disposed within the housing 204, in between the opening 224 and lens 202 (e.g., see FIG. 2B). As a result, the shutter 206 may switch between obscuring the opening 224, thereby covering lens 202, and exposing the opening 224, thereby making the lens 202 of the camera available for use.

Figure 2A:
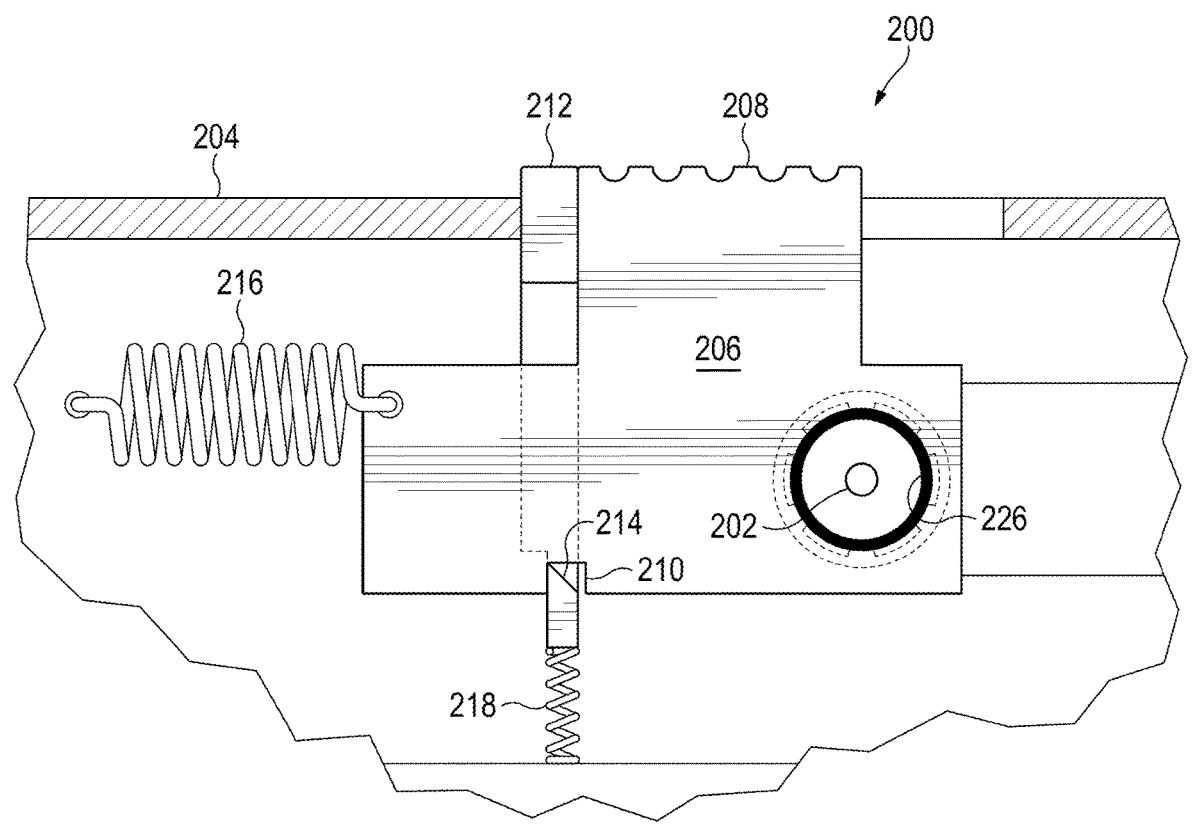
FIGS. 2A-D illustrate another computing device including a housing with a shutter, to provide privacy measures to users of the computing device, according to an example.
Figure 2B:
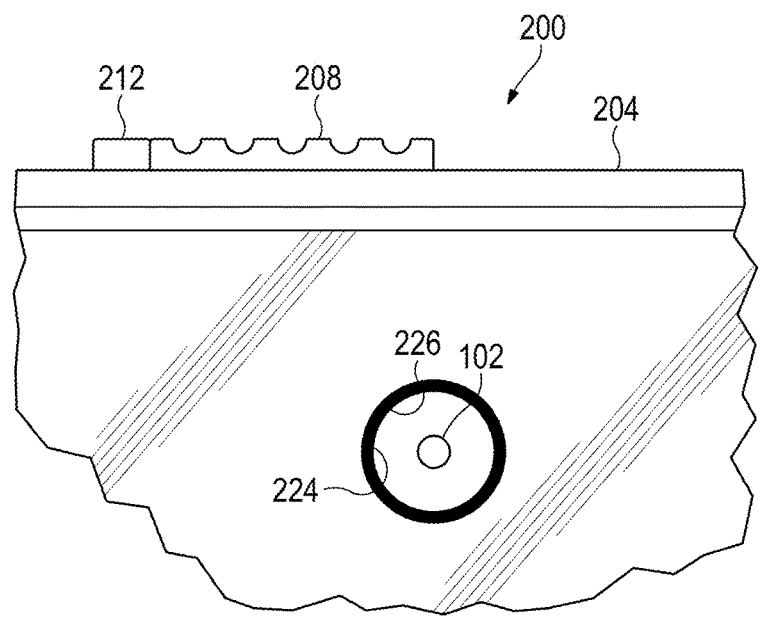
Figure 2C:
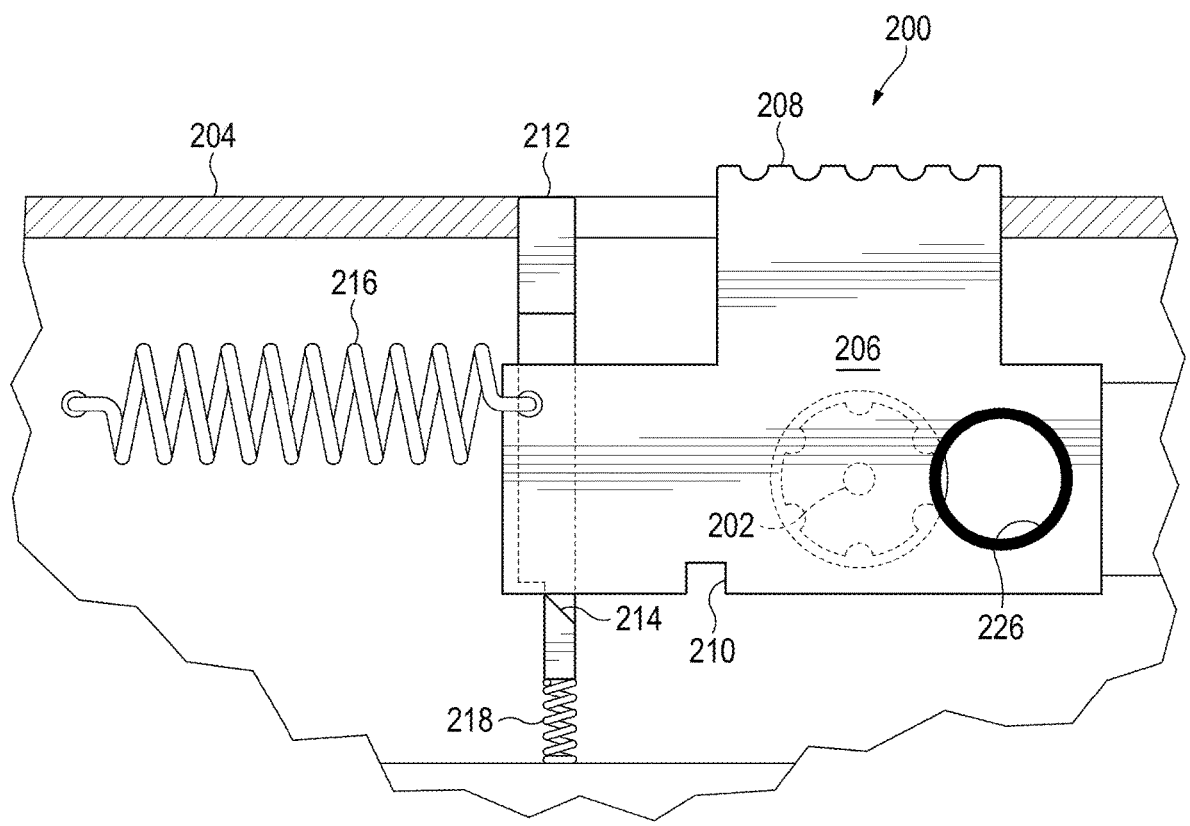
Figure 2D:
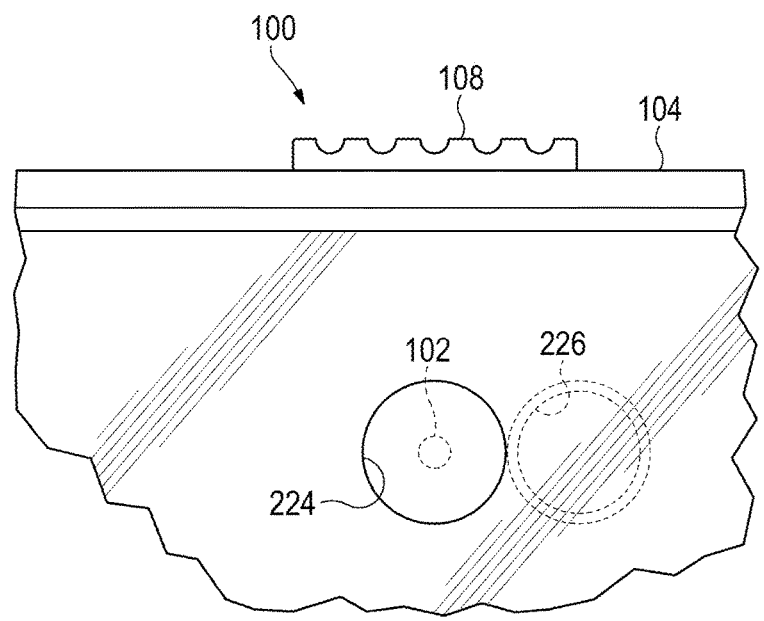

Referring to FIG. 2A, opening 226 in the shutter 206 lines up with opening 224, thereby making the lens 202 of the camera available for use. As an example, spring 216, coupled to the shutter 206, is in a contracted state. Although spring 216 is under tension, the shutter 206 is held in place, due to the placement of the locking pin 212, particularly at 214, within a notch 210 of the shutter 206. As an example, the locking pin 212 may be held in place by a two-way shape memory alloy 218 coupled to the locking pin 212, until either a manual or digital activation occurs. As an example, the shutter 206 can be activated manually by a user to obscure the opening 224, by the user pressing down on the locking pin 212 near the knob 208, thereby releasing the locking pin 212 at 214 from the notch 210 of the shutter 206. As a result, spring 216 transitions from a contracted state to an equilibrium state (or slightly contracted) while moving the shutter 206 to obscure the opening 224, as illustrated in FIG. 2C.

With regards to digital activation, the computing device 200 comprises a mechanical trigger, upon receiving an electrical signal, to move the shutter 206 to obscure the opening 224. Referring back to FIG. 2A, the mechanical trigger may correspond to a number of the illustrated components of computing device 200, particularly a combination of spring 216, two-way shape memory alloy 218, and locking pin 212. Starting at FIG. 2A, memory alloy 218 is in an extended or deformed state. However, upon receiving an electric current, for example, due to the digital activation, the memory alloy 218 may contract by changing to its original form, pulling the locking pin 212. Pulling of the locking pin 212, particularly at 214, moves the locking pin 212 down and out of the notch 210 of the shutter 206. Finally, spring 216 transitions from the contracted state to the equilibrium state (or slightly contracted) while moving the shutter 206 to obscure the opening 224, as illustrated in FIG. 2C. As an example, memory alloy 218 naturally cools off and returns to its deformed state, hence the two-way form of the memory alloy. However, the return of the memory alloy 218 to its deformed state, as illustrated in FIG. 2A, requires manual intervention, as will be further described.

Upon activating the shutter 206 to obscure opening 224, whether by manual or digital activation, a physical action, or manual intervention, may then be required by a user of the computing device 200, such as moving the shutter 206 back in an opposite direction, in order to line up opening 226 in the shutter 206 with the opening 224, thereby making the lens 202 of the camera available for use again. As a result, although digital activation may be used to mechanically trigger movement of the shutter 206 to obscure opening 224, a mechanical feature may block a trigger, electronically or via digital activation, from moving the shutter 206 to expose the opening 224 again. For example, by relying on the arrangement of the springs, particularly spring 216, and the displacement of the locking pin 212 from notch 210, manual intervention may be required to move shutter 206, in order to make lens 202 of the camera available for use again. As an example, a knob 208 coupled to the shutter 206 may be used by the user to move the shutter 206 back to the position illustrated in FIG. 2A. Once the shutter 206 is moved back via the knob 208, memory alloy 218 returns to its deformed state, moving the locking pin 212 back into the notch 210 at 214. The shutter 206 may then be digitally (or manually) activated once again to provide privacy measures, when necessary.

Figure 3:
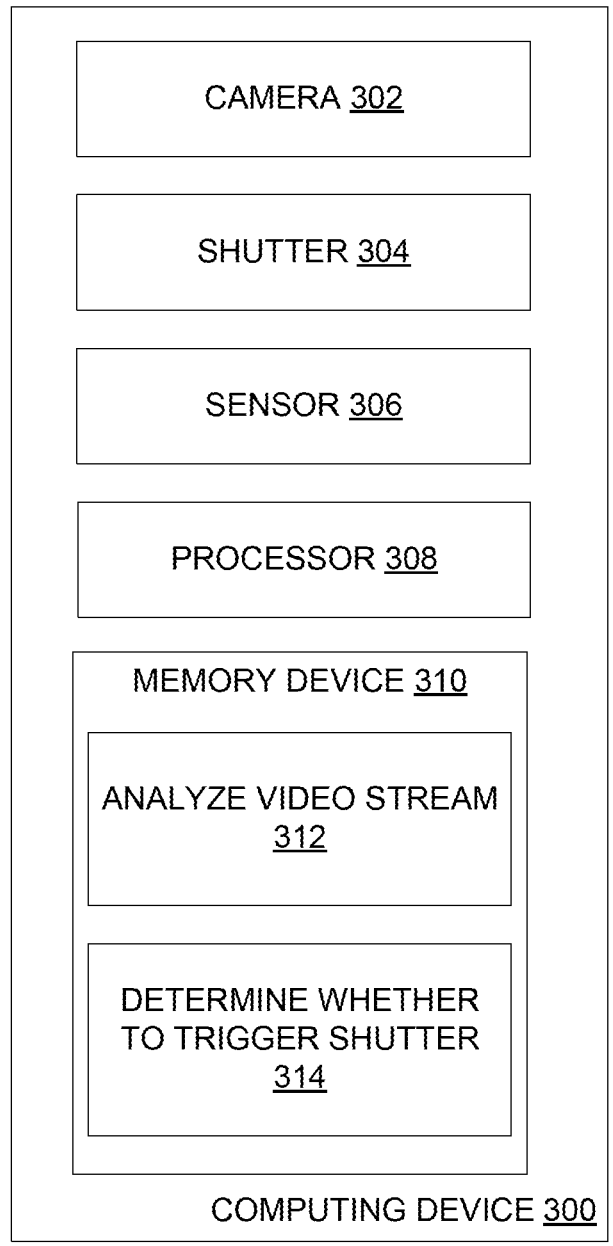
FIG. 3 illustrates a computing device with a camera and sensor that may be used, alone or in combination, to determine when to trigger a shutter of the camera, according to an example.

FIG. 3 illustrates a computing device 300 with a camera 302 and sensor 306 that may be used, alone or in combination, to determine when to trigger a shutter 304 of the camera 302, according to an example. As described above, in addition to manually activating the shutter 304 to cover a lens of the camera 302, the shutter 304 may also be electronically controlled by machine learning that automates the process in making the determination when to digitally activate the shutter 304 to obscure the lens of the camera 302. As an example, the computing device 300, by analyzing video stream captured by the camera 302 via the lens, and relying on various sensors 306, may make predictions when the shutter 304 needs to be triggered to obscure the lens. Reference may be made to computing devices 100, 200. However, in addition electronically controlling the shutter 304 to mechanically cover a lens of the camera 302, other privacy enabling methods may be used as well and, as a result, is not limited to the methods described herein.

The computing device 300 depicts a processor 308 and a memory device 310 and, as an example of the computing device 300 performing its operations, the memory device 310 may include instructions 312-314 that are executable by the processor 308. Thus, memory device 310 can be said to store program instructions that, when executed by processor 308, implement the components of the computing device 300. The executable program instructions stored in the memory device 310 include, as an example, instructions to analyze video stream (312), and instructions to determine whether to trigger shutter 304 (314).

Instructions to analyze video stream (312) represent program instructions that when executed by the processor 308 cause the computing device 300 to analyze video stream captured by the camera 302 via the lens. As an example, a neural network may intercept the video stream coming from the camera 302 and make determinations on whether or not that the video stream indicates that the shutter 304 should be triggered to obscure the lens of the camera 302. If the situation is deemed sensitive or private, then the shutter 304 may be triggered, as will be further described.

As an example, the computing device 300 may detect images from the captured video stream indicating a need for privacy. Examples of such images include private spaces, such as a bathroom or bedroom, a hand attempting to cover the camera 302, inappropriate attire, and underage subjects, among others. With regards to underage subjects, particularly in a corporate environment, it is unlikely a child would need to be on the video stream. As a result, detecting children may be good cause to trigger the shutter 304 to obscure the lens of the camera 302, and protect the privacy of children, for example, of a teleworker. With regards to inappropriate attire, if images captured from the video stream indicate that a participant is undressing (or dressing) may be sufficient cause indicating a need for privacy. Confidentiality signs and user-initiated signals may also provide a need for privacy. For example, signs with the label "confidential" may be a good cause to trigger the shutter 304. In addition, common gestures that a user might use to cover the lens of the camera 302, such as a hand up to block the lens of the camera 302, or a thumb attempting to cover the lens can be pre-detected and used to pre-emptively trigger the shutter 304 to obscure the lens of the camera 302.

Instructions to determine whether to trigger shutter 304 (314) represent program instructions that when executed by the processor 308 cause the computing device 300, based on the captured video stream, to determine whether to transmit an electrical signal to move the shutter 304 to obscure the lens of the camera 302. As described above, if images detected from the captured video stream indicate a need for privacy, the computing device may transmit the electrical signal to trigger the shutter 304. Referring back to computing device 100, the electrical signal may correspond to the electric current applied to memory alloy 118, resulting in shutter 106 obscuring lens 102 (e.g., see FIG. 1C). Similarly, referring back to computing device 200, the electrical signal may correspond to the electric current applied to memory alloy 218, resulting in shutter 206 obscuring lens 202 (e.g., see FIG. 2C).

As an example, in addition to relying on images detected from the video stream when determining whether to trigger the shutter 304, the computing device 300 may also rely on input received from a sensor 306. Although the neural network described above may rely primarily on the video stream coming from camera 302 in making determinations on whether or not to trigger the shutter 304, the neural network may also rely on inputs from different sensors in making its determination. As an example, input from the sensor 306 may include information relating to a location of the computing device 300, environmental information of where the computing device 300 is located, and noise collected by a microphone of the computing device 300. With regards to location, the sensor 306 can correspond to network cards and wireless adapters. As an example, administrator can set up a geo-fencing in order to determine that the computing device 300 be in Privacy Mode (e.g., shutter 304 obscuring lens of camera 302) whenever the computing device 300 is within a certain area or location.

Humidity and other environmental sensors can also provide input as to the potential location of the user of the computing device 300. For example, the humidity of the user's workspace may differ from their home environment. As a result, a bathroom, for instance, is likely to have a higher humidity than any other room in the house, triggering to activate the shutter 304 in certain situations. Sensor 306 can also correspond to a microphone, in determining the current environment/location of the computing device 300. For instance, noise patterns can make determinations that the user is in one location versus another, triggering to activate the shutter 304 in certain situations. As an example, the operating system of the computing device 300 can make determinations on sensitive data based on the applications that it is running. For instance, the user may be at home if they utilize some applications over ones at work, as a result, triggering to activate the shutter 304 in certain situations.

Although the computing device 300 may include a database of known scenarios and types of images that would indicate that the camera 302 should be blocked by the shutter 304, the computing device 300 may also learn over time by detecting user interactions with the shutter 304, and enter such user interactions in a feedback loop. For example, if the computing device 300 determines that the user operating the computing device 300 is at home and, as a result, triggers the shutter 304 to cover the camera 302, if the computing device 300 then detects that the user continues to remove the shutter 304 from the camera 302, the computing device 300 may learn over time to avoid triggering the shutter 304 to cover the camera 302. Likewise, if the user is constantly covering the camera 302 with the shutter 304 in a certain kind of environment, then the computing device 300 may make note of that and close automatically when the user re-enters that kind of environment. As a result, assumptions made by the computing device 300 may be adjusted over time.

Memory device 310 represents generally any number of memory components capable of storing instructions that can be executed by processor 308. Memory device 310 is non-transitory in the sense that it does not encompass a transitory signal but instead is made up of at least one memory component configured to store the relevant instructions. As a result, the memory device 310 may be a non-transitory computer-readable storage medium. Memory device 310 may be implemented in a single device or distributed across devices. Likewise, processor 308 represents any number of processors capable of executing instructions stored by memory device 310. Processor 308 may be integrated in a single device or distributed across devices.

Further, memory device 310 may be fully or partially integrated in the same device as processor 308, or it may be separate but accessible to that device and processor 308.

In one example, the program instructions 312-314 can be part of an installation package that when installed can be executed by processor 308 to implement the components of the computing device 300. In this case, memory device 310 may be a portable medium such as a CD, DVD, or flash drive or a memory maintained by a server from which the installation package can be downloaded and installed. In another example, the program instructions may be part of an application or applications already installed. Here, memory device 310 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
    a camera comprising a lens; and
    a housing comprising:
        an opening extending through the housing, wherein the opening is to accommodate the lens;
        a shutter to selectively obscure the opening;
        a mechanical trigger, upon receiving an electrical signal, to move the shutter to obscure the opening, wherein the mechanical trigger comprises:
        a locking pin;
        a trigger release to make contact with the locking pin;
        a memory alloy coupled to the trigger release, wherein, upon receiving the electrical signal, the memory alloy is to contract and move the trigger release, wherein, upon the trigger release moving, the locking pin is to be released from a notch of the shutter; and
        a first spring coupled to the shutter, wherein, upon the locking pin releasing from the notch of the shutter, the first spring is to expand and move the shutter to obscure the opening; and
        upon the mechanical trigger engaging the shutter to obscure the opening, a mechanical feature to block the mechanical trigger from moving the shutter to expose the opening.

2. The computing device of claim 1, wherein, upon the shutter moving to obscure the opening, a knob coupled to the shutter is to be manually moved in order to move the shutter to expose the opening.

3. The computing device of claim 2, wherein, upon the shutter moving to expose the opening:
    the first spring is to contract, and
    a second spring coupled to the locking pin is to expand and move the locking pin into the notch of the shutter.

4. The computing device of claim 1, wherein the mechanical trigger is to receive the electrical signal based on video stream captured by the camera via the lens.

5. A computing device comprising:
    a camera comprising a lens; and
    a housing comprising:
        an opening extending through the housing, wherein the opening is to accommodate the lens;
        a shutter to selectively obscure the opening, wherein the shutter comprises a knob and a notch; and
        a mechanical trigger, upon receiving an electrical signal, to cause the mechanical trigger to disengage from the notch, moving the shutter to obscure the opening, wherein upon disengaging from the notch, the mechanical trigger is blocked from moving the shutter to expose the opening, wherein the mechanical trigger comprises:
        a locking pin;
        a memory alloy coupled to the locking pin, wherein, upon receiving the electrical signal, the memory alloy is to contract and pull the locking pin to be released from the notch of the shutter; and
        a spring coupled to the shutter, wherein, upon the locking pin releasing from the notch of the shutter, the spring is to expand and move the shutter to obscure the opening.

6. The computing device of claim 5, wherein, upon the shutter moving to obscure the opening, the knob of the shutter is to be manually moved in order to move the shutter to expose the opening.

7. The computing device of claim 6, wherein, upon the shutter moving to expose the opening:
    the spring is to contract, and
    the memory alloy coupled to the locking pin is to expand and move the locking pin into the notch of the shutter.

8. The computing device of claim 5, wherein the mechanical trigger is to receive the electrical signal based on video stream captured by the camera via the lens.

* * * * *